United States Patent
Yamada

(10) Patent No.: US 8,174,605 B2
(45) Date of Patent: May 8, 2012

(54) IMAGE PROCESSING APPARATUS AND IMAGE PROCESSING METHOD

(75) Inventor: Motonari Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/469,926

(22) Filed: May 21, 2009

(65) Prior Publication Data

US 2009/0303373 A1 Dec. 10, 2009

(30) Foreign Application Priority Data

Jun. 4, 2008 (JP) ................................. 2008-146996

(51) Int. Cl.
*H04N 5/222* (2006.01)

(52) U.S. Cl. ............. 348/333.02; 348/208.1; 348/208.2; 348/209.3; 348/208.16; 348/333.01; 348/333.12; 348/333.03; 348/333.04; 348/333.05; 348/333.06; 348/333.07; 348/333.08; 348/333.09; 348/333.1; 348/333.11

(58) Field of Classification Search ........................ None
See application file for complete search history.

(56) References Cited

U.S. PATENT DOCUMENTS

| 2002/0092029 A1* | 7/2002 | Smith | 725/105 |
| 2008/0295015 A1* | 11/2008 | Liu et al. | 715/772 |

FOREIGN PATENT DOCUMENTS

| JP | 11-146317 A | | 5/1999 |
| JP | 11146317 | * | 5/1999 |
| JP | 2007-049484 A | | 2/2007 |
| KR | 10-2007-0113025 A | | 11/2007 |
| KR | 10-0795450 B1 | | 1/2008 |
| WO | WO 2004066615 A1 | * | 8/2004 |

* cited by examiner

*Primary Examiner* — Nicholas Giles
*Assistant Examiner* — Yih-Sien Kao
(74) *Attorney, Agent, or Firm* — Canon USA Inc IP Division

(57) ABSTRACT

There is provided an image processing apparatus allowing a user to easily process a captured image. This image processing apparatus displays an image generated based on image data and an item representing processing for the image data on a screen, detects a change in the orientation thereof, and performs processing upon the image data corresponding to the displayed image based on a detection result of the change in the orientation thereof.

12 Claims, 11 Drawing Sheets

IMAGE PROCESSING APPARATUS AND IMAGE PROCESSING METHOD

BACKGROUND OF THE INVENTION

1. Field of the Invention

The present invention relates to image processing apparatuses and image processing methods, and, more particularly, to an image processing apparatus and an image forming method for performing processing upon an image on the basis of an item that is selected from among items displayed with the image on the same screen in accordance with a change in the orientation of the image processing apparatus.

2. Description of the Related Art

Image processing apparatuses such as digital cameras in the related art have an operation unit including a release button and a zoom lever on a housing thereof. A user operates this operation unit so as to cause such an image processing apparatus to perform various operations. Image processing apparatuses capable of displaying a captured image on a display unit thereof such as a liquid crystal display are widely known. In recent years, systems have been proposed which allow a user to control a digital camera by operating a touch panel disposed in front of a display screen for displaying an image captured by the digital camera.

Japanese Patent Laid-Open No. 11-146317 discloses a digital camera including a display unit for displaying an image captured by the digital camera and operation items over the captured image, and a touch panel disposed in front of the display unit. A method of allowing a user to operate the digital camera by touching one of the operation items displayed on the display unit via the touch panel has been proposed.

On the other hand, a system for processing an image using a change in the orientation of an image processing apparatus has been proposed. Japanese Patent Laid-Open No. 2007-49484 discloses a digital camera including an inclination detection unit for detecting the inclination of the digital camera and a slide show display unit for displaying a slide show on the basis of the detection result. An intuitive image viewing method such as a slide show or frame-by-frame playback has been proposed.

However, in image processing apparatuses in the related art, in order to correct the color or brightness of an image or delete an image, a user needs to press an operation button with a finger or operate a touch panel with a touch pen. This is a counterintuitive and complicated operation for the user. Even in image processing apparatuses in the related art employing an intuitive operation method, the intuitive operation method is used only when a user views an image. Thus, performable processing using the intuitive operation method is limited. With the current trend toward a greater capacity of recording media for recording captured images, there is a need to allow a user to easily process a captured image.

SUMMARY OF THE INVENTION

The present invention provides an image processing apparatus and an image processing method for displaying an image to be processed and items representing processing on the same screen so as to allow a user to intuitively process the image.

According to an embodiment of the present invention, there is provided an image processing apparatus for displaying an image which includes a display unit configured to display the image generated based on image data and an item representing processing for the image data; a detection unit configured to detect a change in an orientation of the image processing apparatus; a processing unit configured to perform the processing represented by the item upon the image data; a control unit configured to control the processing unit so as to cause the processing unit to perform the processing represented by the item upon the image data corresponding to the image based on a detection result of the detection unit; and a moving unit configured to move the image displayed on the display unit. The moving unit moves the image displayed on the display unit based on a detection result of the detection unit. The control unit controls the processing unit so as to cause the processing unit to perform upon the image data the processing represented by the item located at a position of the image moved by the moving unit.

According to an embodiment of the present invention, there is provided an image processing method for an image processing apparatus for displaying an image. The image processing method includes displaying the image generated based on image data and an item representing processing for the image data on a display unit; detecting a change in an orientation of the image processing apparatus; performing processing represented by the item upon the image data corresponding to the image based on a detection result; and moving the image displayed on the display unit. The image displayed on the display unit is moved based on a detection result. Processing represented by the item located at a position of the moved image is performed upon the image data.

Further features of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the accompanying drawings.

Figure 1:
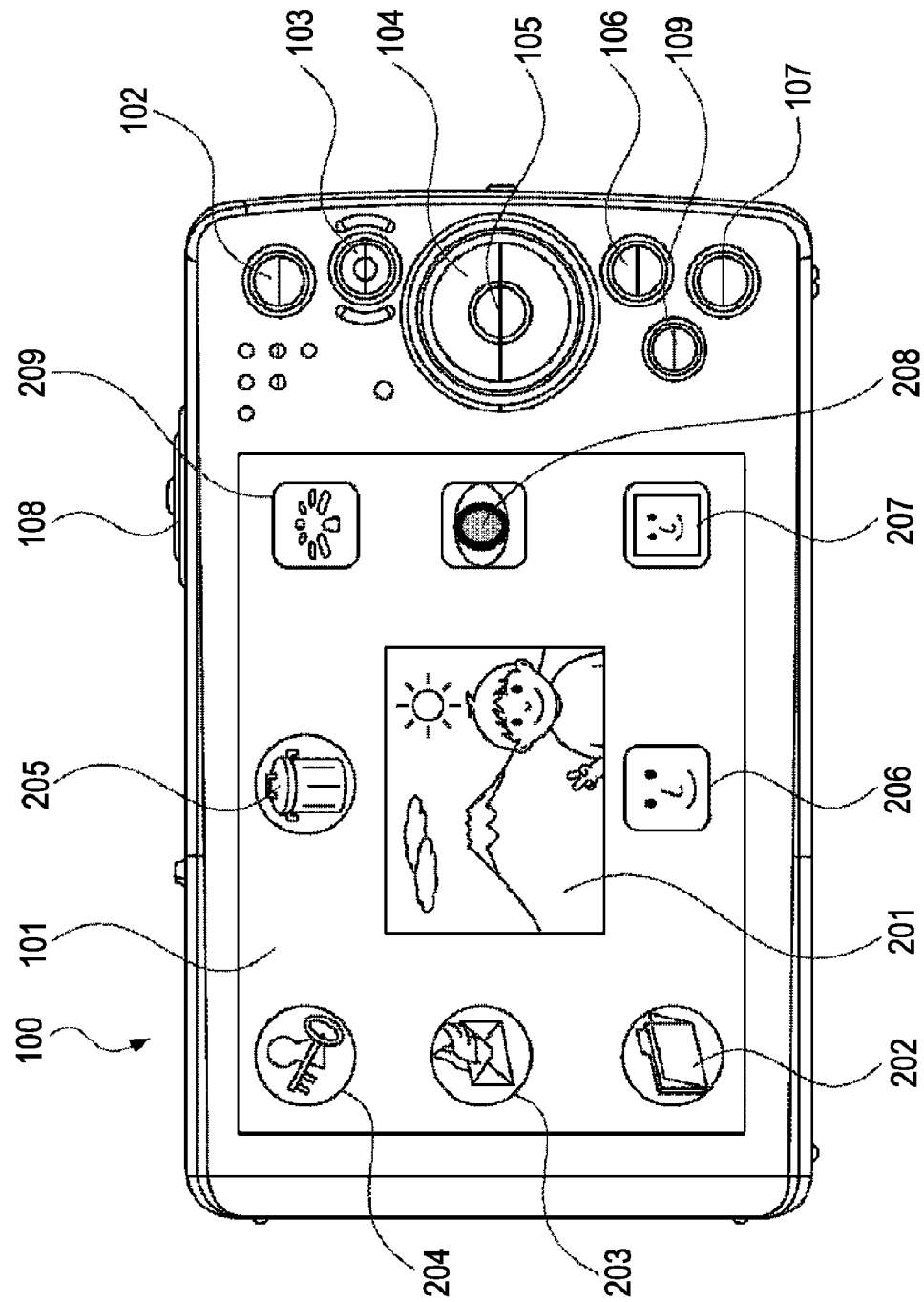
FIG. 1 is a rear view of an image processing apparatus according to an embodiment of the present invention.

FIG. 1 is a rear view of an image processing apparatus according to a first embodiment. In the following description, a digital camera is used as an image processing apparatus according to an embodiment of the present invention.

Referring to FIG. 1, an image processing apparatus 100 is illustrated. In this embodiment, the image processing apparatus 100 is a digital camera.

A display unit 101 is a unit for displaying a captured image, a reproduction image, various pieces of data, an operation menu, icons, etc., and is, for example, an LCD (Liquid Crystal Display). A plurality of display units may be used as a single screen. A power button 102 is used to switch between ON and OFF of the power. A reproduction button 103 is used to set a reproduction mode in which an image is read out from a recording apparatus. A four-direction key 104 is used to move a cursor vertically and horizontally at the time of menu selection.

An OK button 105 is used to determine a menu item. A display button 106 is used to switch between a processing mode icon display mode and a processing mode icon non-display mode on the display unit 101. A switch button 109 is a button for switching. A menu button 107 is used to change the setting of the image processing apparatus 100. A release button 108 is used to input an image capturing start instruction, and is a two-step (half-pressing and full-pressing) stroke switch. If the release button 108 is pressed halfway down, a first switch is turned on and the AE/AF function of the digital camera is operated. If the release button 108 is pressed all the way down, a second switch is turned on and image capturing of a subject is performed.

On the display unit 101, a thumbnail image 201 of a captured image is displayed. Icons 202 to 209 are displayed as items representing pieces of processing for image data for storage that is an original of the thumbnail image 201. Resize processing is performed upon the image data for storage to reduce the number of pixels included in the image data for storage, so that the thumbnail image 201 is generated.

A storage icon 202 is used to store an image in a folder. A mail icon 203 is used to transmit an image by e-mail. A protection icon 204 is used to protect an image. A trash icon 205 is used to delete an image. A face preferential correction icon 206 is used to detect a face of a person from the image data for storage and perform luminance correction and color correction upon the image data for storage so that the brightness and color of the detected face become optimum values. An enlarged face display icon 207 is used to detect a face of a person from the image data for storage, enlarge the detected face, and display the enlarged face. A red-eye correction icon 208 is used to detect a red-eye effect from the image data for storage and correct the detected red-eye effect. A custom color processing icon 209 is used to correct the color of the image data for storage in accordance with a correction mode set in advance.

Although the icons 202 to 209 are displayed in FIG. 1, these icons may be classified into groups in accordance with application and category and these groups may be switched with the switch button 109. For example, these icons may be classified into a group of icons used to perform local correction upon image data and a group of icons used to perform processing upon the whole of image data, for example, delete or protect the image data, and these groups may be switched. In the present invention, any item representing processing or an instruction can be used regardless of the shape of the item. In addition to the above-described items, for example, items representing pieces of processing that are generally performed upon an image may be used. The shape of items is not limited to the above-described icon. For example, items may be provided in the form of a geometric pattern, a mark such as graphics, or the like. Alternatively, items may be classified into groups in accordance with the type of processing, and these groups may be represented by different colors or characters.

Figure 2:
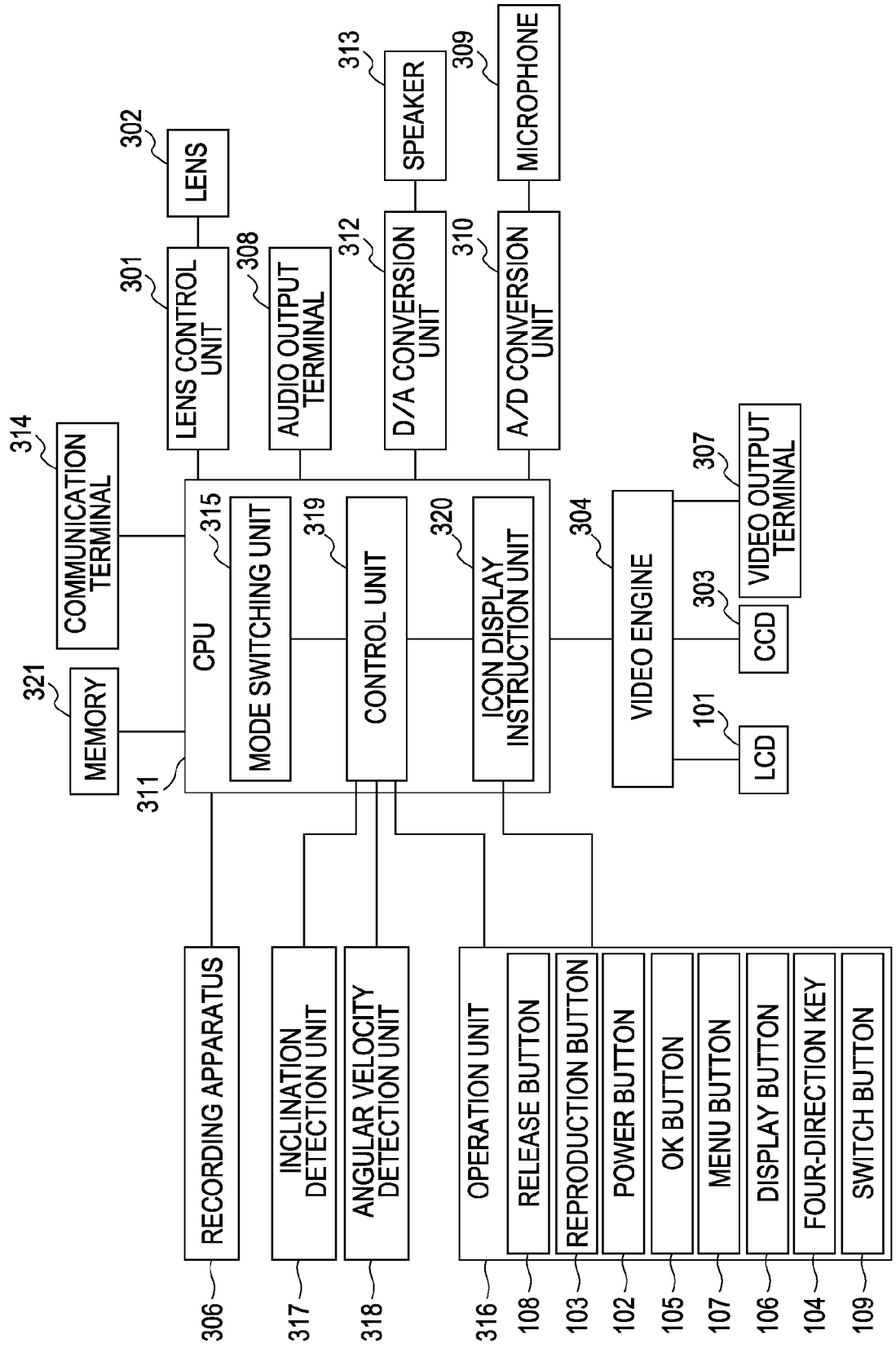
FIG. 2 is a block diagram illustrating a configuration of an image processing apparatus according to an embodiment of the present invention.

FIG. 2 is a block diagram illustrating a configuration of the image processing apparatus 100.

A lens control unit 301 is a unit for controlling a lens 302. The lens 302 is a lens including a zoom lens and a focus lens. A CCD 303 is an image pickup element for receiving light transmitted from a subject through the lens 302, storing an electric charge in accordance with the amount of light received so as to generate image data, and outputting the generated image data. As an image pickup element, a CMOS sensor may be used instead of a CCD. A video engine 304 is an engine for performing signal processing. A recording apparatus 306 is an apparatus for storing an image and additional pieces of information about the attribute of the image and the image capturing date/time of the image. A video output terminal 307 is a terminal for outputting an image signal. An audio output terminal 308 is a terminal for outputting an audio signal. A microphone 309 is a microphone for inputting sound. An A/D conversion unit 310 is a unit for converting an analog signal into a digital signal. A CPU 311 includes a mode switching unit 315, a control unit 319, and an icon display instruction unit 320.

A D/A conversion unit 312 is a unit for converting a digital signal into an analog signal. A speaker 313 is a speaker for outputting an audio signal as sound. A communication terminal 314 is a terminal for externally receiving and transmitting data. The mode switching unit 315 is a unit for switching between various modes. The operation unit 316 includes the above-described various buttons. An inclination detection unit 317 is a unit for detecting the inclination of the image processing apparatus 100. An angular velocity detection unit 318 is a unit for detecting the angular velocity of the image processing apparatus 100. The control unit 319 is a unit for controlling the image processing apparatus 100 on the basis of a program recorded in a memory 321. The icon display instruction unit 320 is a unit for transmitting an instruction for display of an icon. The memory 321 records a program corresponding to a process illustrated in FIG. 3.

Next, the operations of the above-described components will be briefly described.

Light transmitted from a subject through the lens 302 driven by the lens control unit 301 is formed on an image pickup surface of the CCD 303. The light is photoelectrically converted by the CCD 303. An output of the CCD 303 is processed by the video engine 304 that is a signal processing unit, and is then divided into the image data for storage (not illustrated) and thumbnail image data generated from the image data for storage. The image data for storage and the thumbnail image data are output to the recording apparatus 306.

At the time of image capturing and image reproduction, an image signal is output from the video engine 304 to the display unit 101 and the video output terminal 307, and an audio signal is output to the audio output terminal 308.

The microphone 309 is used at the time of image capturing of a moving image or annotation. Sound input from the microphone 309 is converted into a digital signal by the A/D conversion unit 310, input into the CPU 311, and is then recorded in the recording apparatus 306. At the time of reproduction, a signal read out from the recording apparatus 306 by the CPU 311 is transmitted to the D/A conversion unit 312 and is then output from the speaker 313 as sound.

The communication terminal 314 such as a USB terminal allows the CPU 311 to communicate with an external apparatus. As described previously, the CPU 311 can read out video digital data and audio digital data from the recording apparatus 306 and transfer them to a personal computer via the communication terminal 314. The mode switching unit 315 switches among an image capturing mode, a reproduction mode, and a processing mode in accordance with the operation of the operation unit 316, and is connected to the CPU 311. In the reproduction mode, various pieces of processing are performed upon image data, or an attribute is added to the image data.

As a unit for detecting a change in the orientation of the image processing apparatus 100, each of the inclination detection unit 317 for detecting the inclination of the image processing apparatus 100 and the angular velocity detection unit 318 for detecting the angular velocity of the image processing apparatus 100 is connected to the control unit 319 included in the CPU 311. For example, the inclination detection unit 317 is provided with a gravity sensor for detecting the direction of gravitational force. The control unit 319 detects the orientation of the image processing apparatus 100 on the basis of the direction of gravitational force detected by the gravity sensor.

The angular velocity detection unit 318 is provided with, for example, an X-axis gyro sensor, a Y-axis gyro sensor, and a Z-axis gyro sensor. The X-axis gyro sensor detects a rotation about an axis (hereinafter, referred to as an X axis) set in the width direction of an image pickup surface of the CCD 303. The Y-axis gyro sensor detects a rotation about an axis (hereinafter, referred to as a Y axis) set in the height direction of the image pickup surface of the CCD 303. The Z-axis gyro sensor detects a rotation about an axis (hereinafter, referred to as a Z axis) set in the direction perpendicular to an image pickup surface of the CCD 303.

Each of these gyro sensors outputs an angular velocity detection signal with a voltage value corresponding to an angular velocity to the control unit 319 when detecting a rotation. The control unit 319 moves the thumbnail image 201 displayed on the display unit 101 in a direction corresponding to the detection result of the inclination detection unit 317 at a speed corresponding to the detection result of the angular velocity detection unit 318.

If an icon selection operation is performed by the operation unit 316, the thumbnail image 201 is processed and an attribute is associated with the thumbnail image 201 in accordance with the selected icon. The processed image data is recorded in the recording apparatus 306.

The image processing apparatus 100 includes the operation unit 316. The operation unit 316 includes the release button 108 for transmitting an image capturing instruction, the display button 106, the reproduction button 103, the OK button 105, the four-direction key 104, the power button 102, and the menu button 107. The control unit 319 performs processing corresponding to an icon located at a detected position on the basis of an operation result of the operation unit 316.

The operation unit 316 is connected to the icon display instruction unit 320 for transmitting an instruction for display of an icon. The icon display instruction unit 320 displays the icons 202 to 209 or switches among the icons 202 to 209 in accordance with the operation of the operation unit 316. Here, a direction horizontal to the image processing apparatus 100 illustrated in FIG. 1 is defined as the X axis, and a direction perpendicular to the image processing apparatus 100 illustrated in FIG. 1 is defined as the Y axis.

Figure 3:
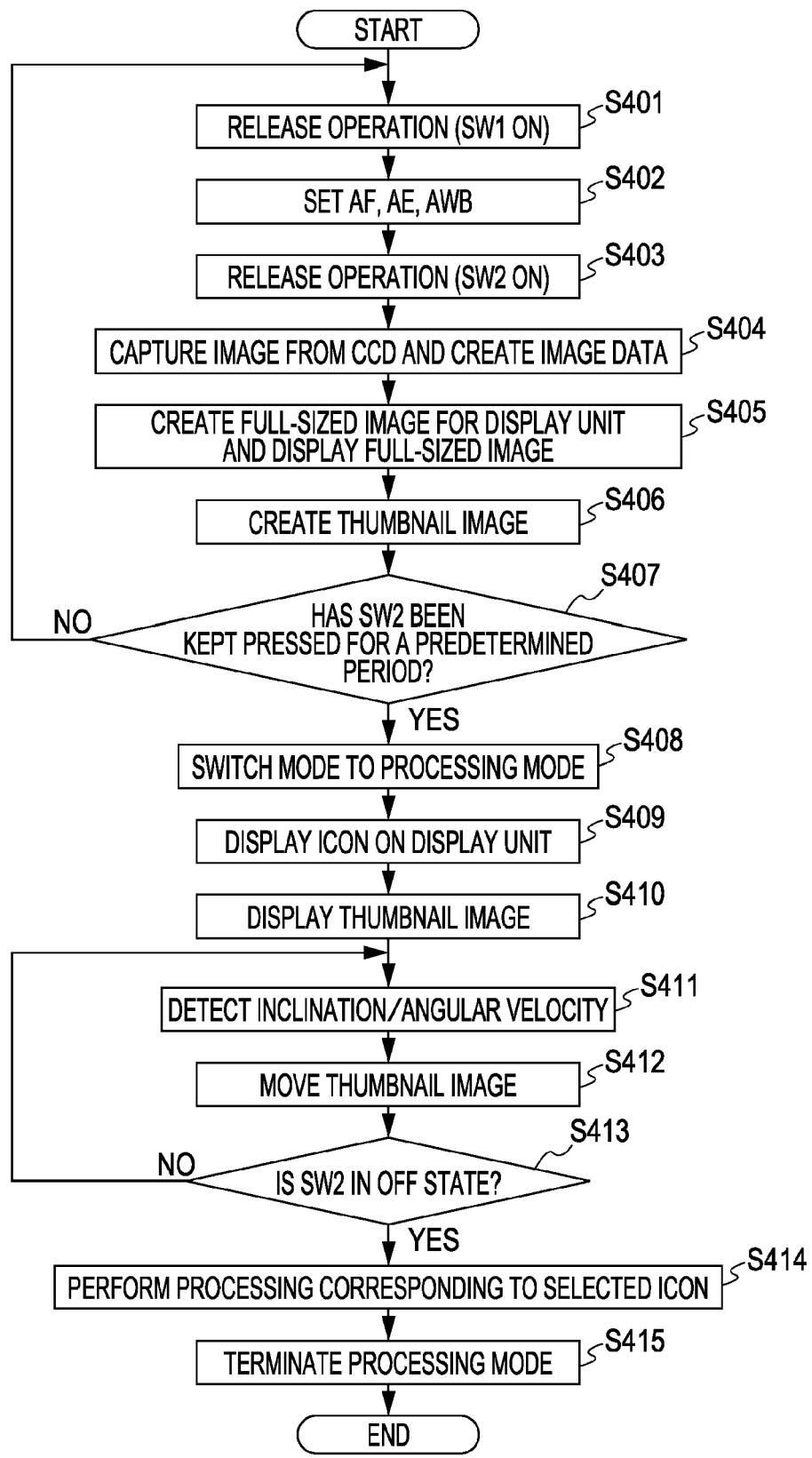
FIG. 3 is a diagram illustrating a process performed by an image processing apparatus according to a first embodiment of the present invention.

FIG. 3 is a diagram illustrating a process of detecting a change in the inclination of the image processing apparatus 100 using the angular velocity detection unit 318 and performing processing corresponding to an icon selected in accordance with the detection result upon an image captured in an image capturing mode. The process illustrated in FIG. 3 is performed using a control program read out from the memory 321 under the control of the control unit 319.

Figure 4:
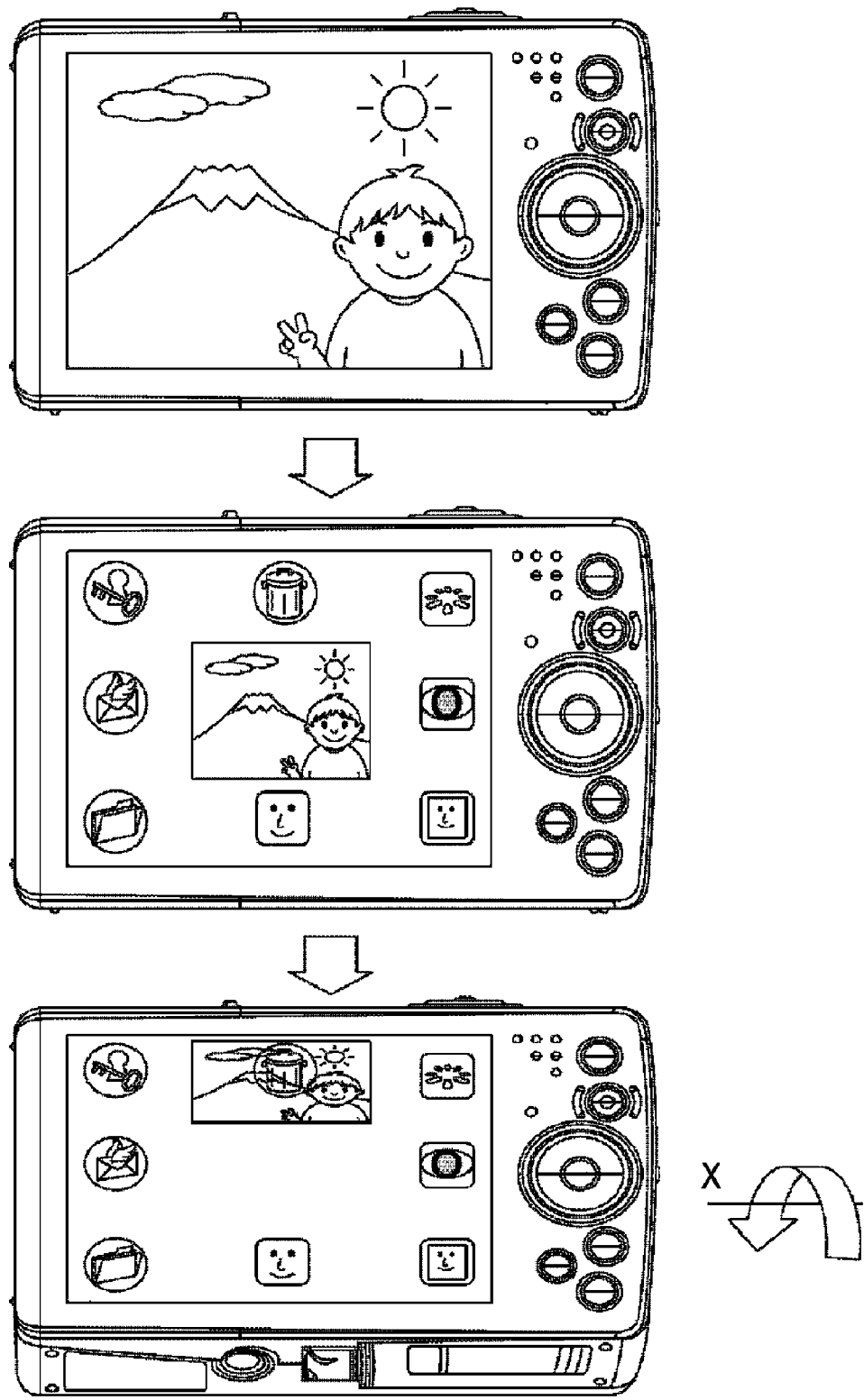
FIG. 4 is a system diagram illustrating a process performed by an image processing apparatus according to the first embodiment of the present invention.

FIG. 4 is a system diagram illustrating the process illustrated in FIG. 3 using actual motions of an apparatus.

A control process performed by the control unit 319 will be described in detail below. If the release button 108 is pressed halfway down, the process illustrated in FIG. 3 is started.

In step S401, the release button 108 is pressed halfway down and it is detected that the first stitch is in the ON state.

In step S402, the lens control unit 301 sets the AF (auto focus) function, the AE (auto exposure) function, and the AWB (auto white balance) function, and the image processing apparatus 100 is in an image capturing preparation state.

In step S403, the release button 108 is pressed all the way down, and it is detected that the second switch is in the ON state.

In step S404, a subject image transmitted through the lens 302 is photoelectrically converted by the CCD 303. An output of the CCD 303 is processed by the video engine 304 that is a signal processing unit and is then output as the image data for storage.

In step S405, the video engine 304 resizes the image data for storage so as to generate a full-sized image for the display unit 101, and the generated full-sized image is displayed on the display unit 101.

In step S406, the video engine 304 resizes the image data for storage so as to generate the thumbnail image 201.

In step S407, the control unit 319 determines whether the second switch of the release button 108 has been kept pressed all the way down for a predetermined period or longer. If the second switch has not been kept pressed all the way down for a predetermined period or longer, the process returns to step S401 and the image capturing mode is continued. If the second switch has been kept pressed all the way down for a predetermined period or longer, the process proceeds to step S408.

In step S408, the mode switching unit 315 changes the mode of the image processing apparatus to the processing mode in which image processing is performed upon the image data for storage or an attribute is added to the image data for storage.

In step S409, the icons 202 to 209 representing pieces of processing for the image data for storage are displayed on the display unit 101.

In step S410, the video engine 304 displays the thumbnail image 201 on the display unit 101.

In step S411, the angular velocity detection unit 318 detects the angular velocity of the image processing apparatus 100, and transmits the detection result to the control unit 319.

In step S412, the video engine 304 moves the thumbnail image 201 in a direction toward which the image processing apparatus 100 has been inclined so as to move the thumbnail image 201 to the position of one of the icons 202 to 209. For example, if the upper portion of the image processing apparatus 100 is inclined forward, the angular velocity detection unit 318 detects the inclination of the image processing apparatus 100 in the X-axis direction. The thumbnail image 201 is moved upwardly on the display unit 101. If the right portion of the image processing apparatus 100 is inclined forward, the inclination of the image processing apparatus 100 in the Y-axis direction is detected and the thumbnail image 201 is moved right. If the image processing apparatus 100 is inclined obliquely, the thumbnail image 201 is moved in a direction obtained by adding detected angular velocities of axes. The thumbnail image 201 is not necessarily moved in the same direction as a direction detected by the angular velocity detection unit 318. The thumbnail image 201 may be moved toward the most appropriate icon in a direction of an angular velocity detected by the angular velocity detection unit 318.

Referring to FIG. 4, if an icon and the thumbnail image 201 overlap, the icon is displayed in front of the thumbnail image 201. However, the thumbnail image 201 may be displayed in front of the icon. Alternatively, either of the icon and the thumbnail image 201 may be transparent so that both of them can be viewed. One of these display methods may be arbitrarily selected.

In step S413, the control unit 319 determines whether the second switch of the release button 108 is in the OFF state. If the second switch of the release button 108 is not in the OFF state, the process proceeds to step S411 and the orientation of the image processing apparatus 100 is continuously detected. That is, while the second switch of the release button 108 is in the ON state, a user can move the thumbnail image 201 on the display unit 101 by inclining the image processing apparatus 100. If it is determined that the second switch is in the OFF state, the process proceeds to step S414.

In step S414, a single icon overlapping the thumbnail image 201 is selected when the second switch of the release button 108 is in the OFF state, and processing corresponding to the selected icon is performed upon the image data for storage. For example, if the thumbnail image 201 overlaps the trash icon 205, the image data for storage corresponding to the thumbnail image 201 located at the position of the trash icon 205 is deleted under the control of the control unit 319. If the thumbnail image 201 overlaps the enlarged face display icon 207, a face of a person is detected from the image data for storage and the detected face is enlarged and displayed. By performing processing corresponding to this icon, a detailed expression on a face included in a captured image can be checked and it can be determined whether the face is in focus. Before processing is performed, a user may determine whether processing corresponding to an icon should be actually performed upon the image data for storage.

In step S415, the processing mode ends.

As described previously, the thumbnail image 201 corresponding to the image data for storage to be processed and icons representing pieces of processing for the image data for storage are displayed together, and the thumbnail image 201 is moved in accordance with a change in the orientation of the image processing apparatus 100. Processing corresponding to an icon located at the position of the moved thumbnail image 201 is performed upon the image data for storage. Thus, a user can intuitively perform processing upon an image without performing a complicated operation, for example, operating a button included in a touch panel or an apparatus.

Next, a case in which the thumbnail image 201 is located on a plurality of icons in step S413 illustrated in FIG. 3 will be described. In this case, for example, an area where the thumbnail image 201 and each of these icons overlap is calculated by the CPU 311 on the basis of information transmitted from the video engine 304, and processing corresponding to one of these icons having the largest overlapping area is performed. Alternatively, a distance between centers of gravity of the thumbnail image 201 and each of these icons may be calculated by the CPU 311, and processing corresponding to one of these icons which has the shortest distance may be preferentially performed. Pieces of processing corresponding to all of these icons overlapping the thumbnail image 201 may be performed. The above-described methods may be arbitrarily switched to perform processing in accordance with the usage of the image processing apparatus 100.

Figure 5:
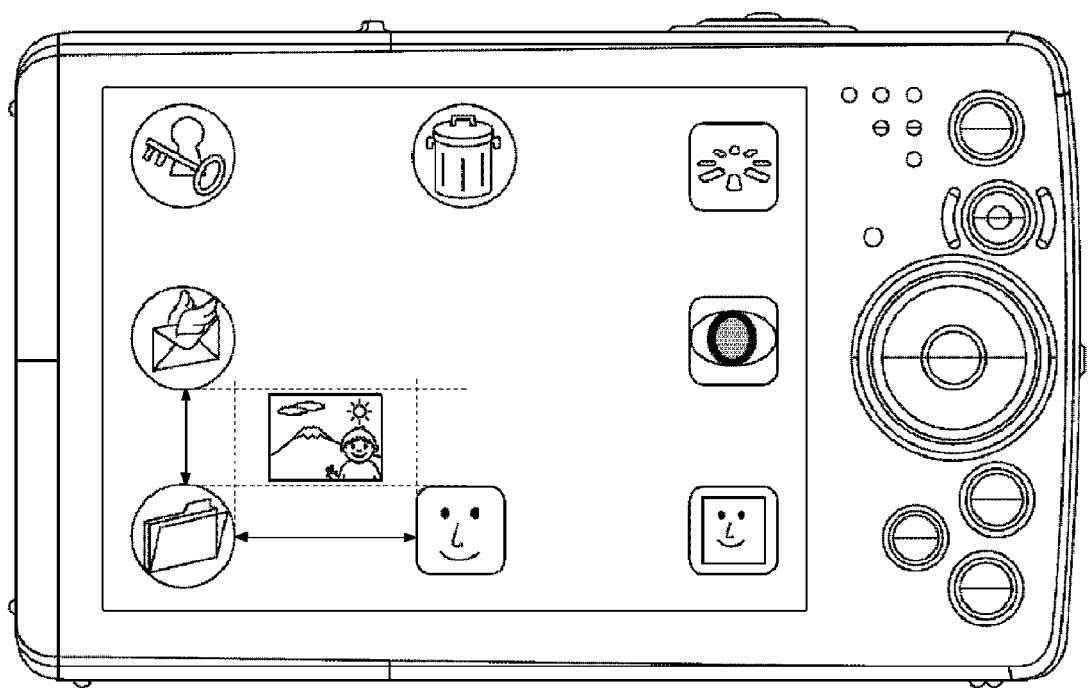
FIG. 5 is a diagram illustrating a case in which a thumbnail image is adjusted in size so as not to overlap a plurality of icons.

In order to prevent the thumbnail image 201 from overlapping a plurality of icons, the size of each icon or the thumbnail image 201 may be controlled by the icon display instruction unit 320. In this case, as illustrated in FIG. 5, by setting the length of the thumbnail image in the X-axis direction shorter than the distance between icons in the X-axis direction and the length of the thumbnail image in the Y-axis direction shorter than the distance between icons in the Y-direction, the thumbnail image 201 can be prevented from overlapping a plurality of icons. Thus, the control of sizes of icons allows a user to always select a single icon. Processing corresponding to the selected icon can be performed upon image data.

In this embodiment, after the control unit 319 has determined that the second switch of the release button 108 is in the OFF state, the processing mode ends and processing corresponding to a selected icon is performed. However, when the control unit 319 determines that the thumbnail image 201 has been moved and the moved thumbnail image 201 and one of icons has overlapped in the processing mode, the processing mode may end and processing corresponding to the icon determined to have first overlapped the thumbnail image 201 may be performed upon the image data for storage.

Next, a second embodiment of the present invention will be described.

In the first embodiment, an intuitive operation can be achieved using a method of moving an image to be processed in accordance with a change in the orientation of a digital camera. On the other hand, in the second embodiment, an intuitive operation can be achieved using a method of moving a cursor used for selection of an item representing processing in accordance with a change in the orientation of a digital camera. Like in the first embodiment, in the second embodiment, a digital camera is used as an image processing apparatus. The same reference numerals are used to identify components already described with reference to the rear view of a digital camera according to the first embodiment illustrated in FIG. 1 and the block diagram of the digital camera illustrated in FIG. 2. A program corresponding to a process illustrated in FIG. 6 is recorded in the memory 321.

Figure 6:
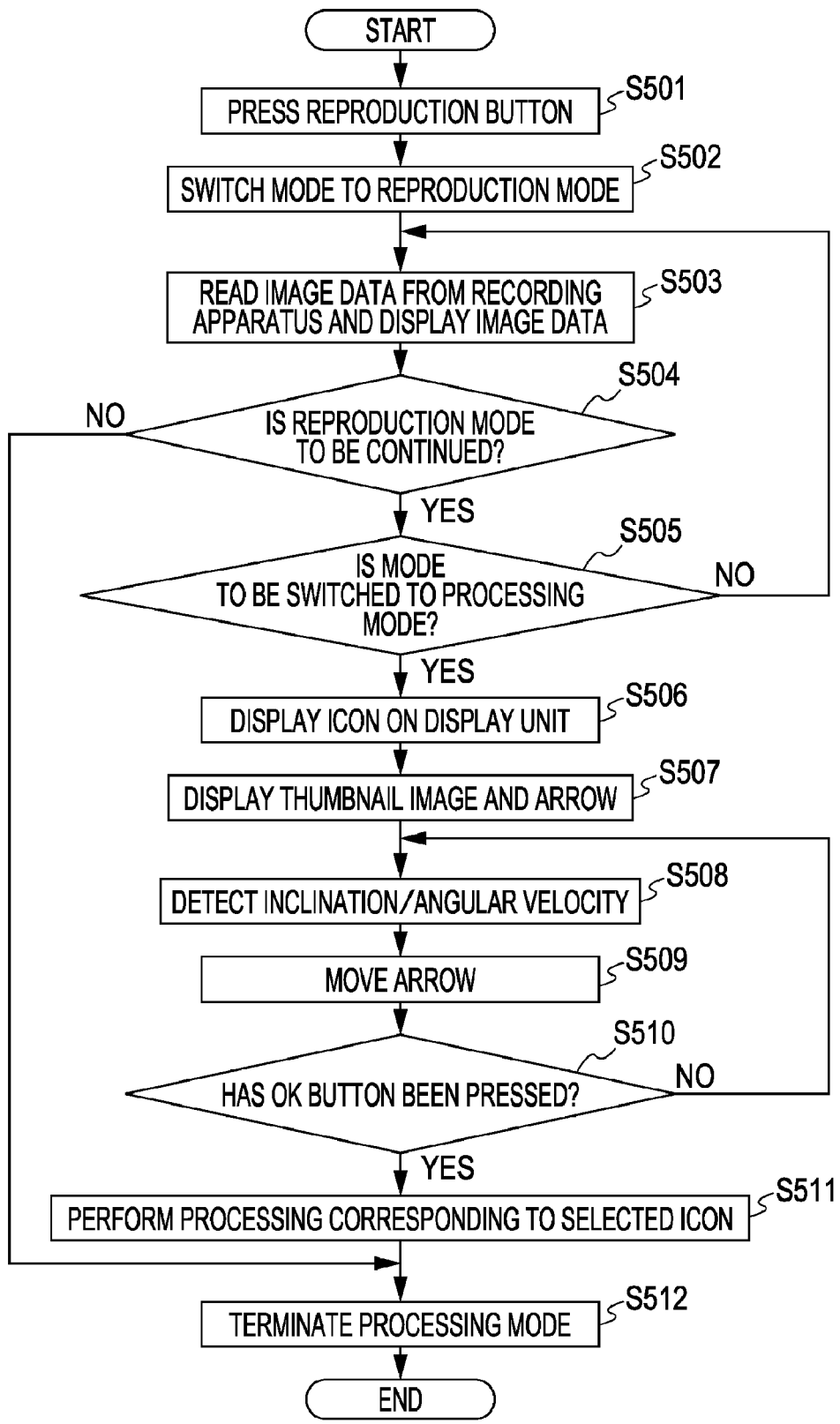
FIG. 6 is a diagram illustrating a process performed by an image processing apparatus according to a second embodiment of the present invention.

FIG. 6 is a diagram illustrating a process of performing processing corresponding to an icon selected in accordance with a detection result of the angular velocity detection unit 318 upon an image being reproduced in a reproduction mode.

Figure 7:
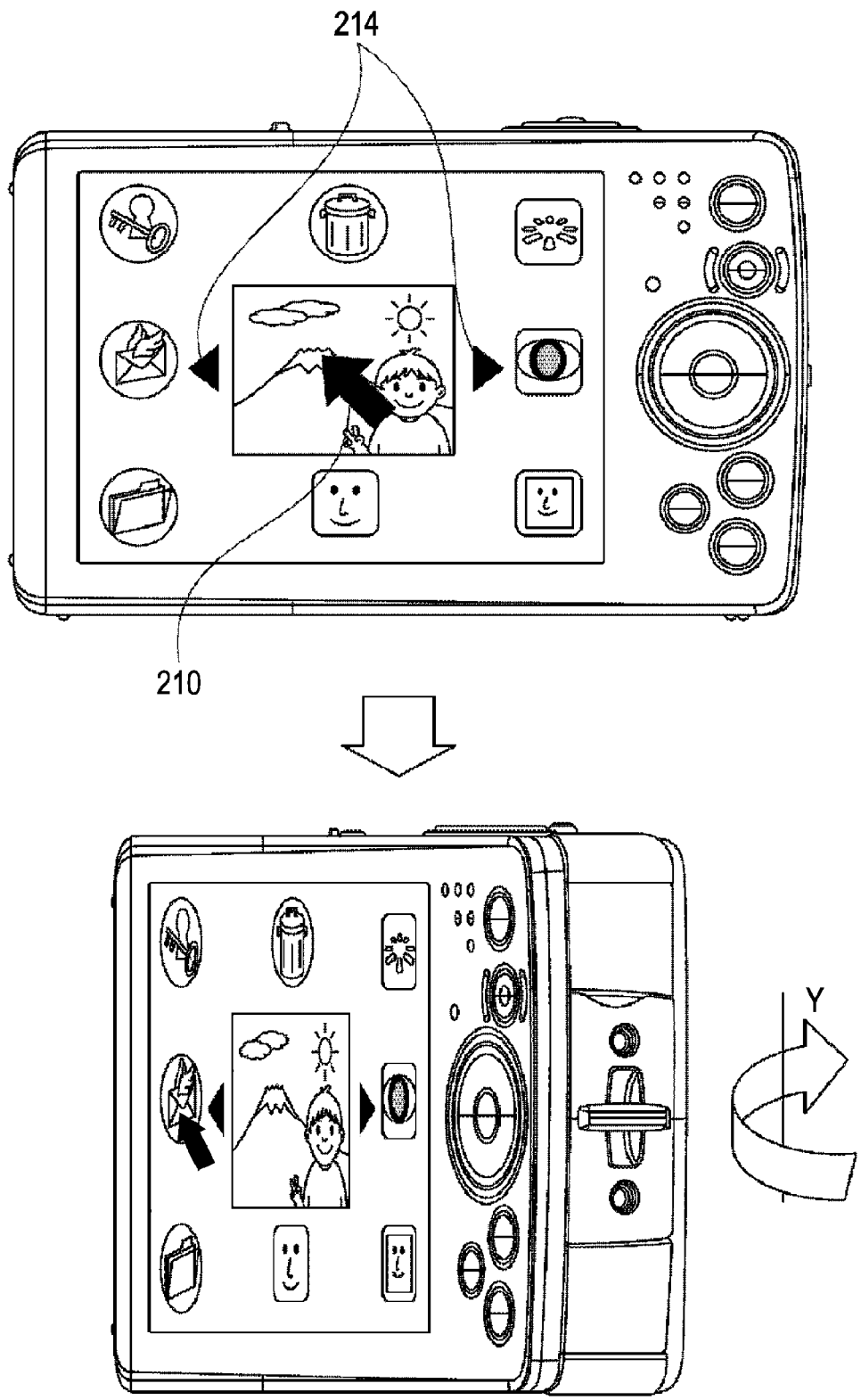
FIG. 7 is a system diagram illustrating a process performed by an image processing apparatus according to the second embodiment of the present invention.

FIG. 7 is a system diagram illustrating the process illustrated in FIG. 6 using actual motions of an apparatus. An arrow 210 illustrated in FIG. 7 is a cursor according to this embodiment. Like in the case of the thumbnail image 201 according to the first embodiment, the cursor is displayed on the display unit 101, and is moved on the display unit 101 in accordance with detection results of the inclination detection unit 317 and the angular velocity detection unit 318 under the control of the control unit 319. An image switching mark 214 is an item representing processing. If the image switching mark 214 is selected with the arrow 210, switching among images to be processed is performed. The process illustrated in FIG. 6 is performed in accordance with a control program read out from the memory 321 under the control of the control unit 319.

A control process performed by the control unit 319 will be described in detail below. If the reproduction button 103 is pressed, the process illustrated in FIG. 6 is started.

In step S501, it is checked that the reproduction button 103 has been pressed.

In step S502, the mode switching unit 315 changes the mode of the image processing apparatus 100 to a reproduction mode.

In step S503, the CPU 311 reads out the image data for storage from the recording apparatus 306. The read image data for storage is resized by the video engine 304 and is then displayed on the display unit 101 as an image.

In step S504, if it is determined that the release button 108 or the power button 102 has been pressed, the reproduction mode ends. If the pressed button is the release button 108, the reproduction mode is changed to an image capturing mode. If the pressed button is the power button 102, the image processing apparatus 100 is powered off. If it is determined that the release button 108 and the power button 102 have not been pressed, the reproduction mode is continued and the process proceeds to step S505.

In step S505, if it is determined that the display button 106 has been pressed, the reproduction mode is changed to the processing mode. If it is not determined that the display button 106 has been pressed, the reproduction mode is continued.

In step S506, the icon display instruction unit 320 displays the icons 202 to 209 representing pieces of processing for the image data for storage on the display unit 101 in accordance with the operation of the display button 106.

In step S507, the video engine 304 displays the thumbnail image 201 and the arrow 210 on the display unit 101. Switching among the thumbnail images 201 to be processed can be performed with the four-direction key 104. If the arrow 210 is moved to the position of the image switching mark 214, switching among the thumbnail images 201 to be processed can also be performed.

In step S508, the angular velocity detection unit 318 detects the angular velocity of the image processing apparatus, and transmits the detection result to the control unit 319.

In step S509, the video engine 304 moves the arrow 210 in a direction toward which the image processing apparatus 100 has been inclined so as to move the arrow 210 to the position of one of the icons 202 to 209. For example, if the upper portion of the image processing apparatus 100 is inclined forward, the angular velocity detection unit 318 detects the inclination of the image processing apparatus 100 in the X-axis direction and the arrow 210 is moved upwardly on the display unit 101. If the right portion of the image processing apparatus 100 is inclined forward, the inclination of the image processing apparatus 100 in the Y-axis direction is detected and the arrow 210 is moved right. If the image processing apparatus 100 is inclined obliquely, the arrow 210 is moved in a direction obtained by adding detected angular velocities of axes. The arrow 210 is not necessarily moved in the same direction as a direction detected by the angular velocity detection unit 318. The arrow 210 may be moved toward the most appropriate icon in a direction of an angular velocity detected by the angular velocity detection unit 318.

Referring to FIG. 7, if an icon and the arrow 210 overlap, the arrow 210 is displayed in front of the icon. However, the icon may be displayed in front of the arrow 210. Alternatively, either of the icon and the arrow 210 may be transparent so that both of them can be viewed. One of these display methods may be arbitrarily selected.

In step S510, the control unit 319 determines whether the OK button 105 has been pressed and is in the OFF state. If the OK button 105 is not in the OFF state, the inclination of the image processing apparatus 100 is continuously detected. That is, until the OK button 105 is pressed, a user can change a moving direction of the arrow 210 on the display unit 101 by inclining the image processing apparatus 100. If it is determined that the OK button 105 has been pressed, the process proceeds to step S511.

In step S511, one of icons which overlaps the arrow 210 is selected when the OK button 105 is in the OFF state, and processing corresponding to the selected icon is performed upon the image data for storage. For example, if the arrow 210 overlaps the protection icon 204, the image data for storage which is displayed on the display unit 101 as image data corresponding to the thumbnail image 201 is protected under the control of the control unit 319. If the arrow 210 overlaps the face preferential correction icon 206, a face of a person is detected from the image data for storage. Luminance correction and color correction are performed upon the image data for storage so that the brightness value and color value of the detected face are set to optimum values. Before processing corresponding to the selected icon is performed upon the image data for storage, a user may determine whether the processing should be actually performed upon the image data for storage.

In step S512, the processing mode ends.

As described previously, the thumbnail image 201 corresponding to the image data for storage to be processed and icons representing pieces of processing for the image data for storage are displayed together, and the arrow 210 is moved in accordance with a change in the orientation of the image processing apparatus 100. Processing corresponding to an icon located at the position of the moved arrow 210 is performed upon the image data for storage. Thus, a user can intuitively perform processing upon an image without performing a complicated operation, for example, operating a button included in a touch panel or an apparatus. In the first embodiment, if the thumbnail image 201 overlaps a plurality of icons, an area where the thumbnail image 201 and each of these icons overlap or the distance between the centers of gravity of the thumbnail image 201 and each of these icons is detected. On the basis of the detection result, one of these icons is selected. However, in this embodiment, an icon overlapping the end portion of the arrow 210 may be preferentially selected.

Next, a third embodiment of the present invention will be described.

In the first and second embodiments, in order to select an item representing processing, an image to be processed or a cursor is moved in accordance with the angular velocity of a digital camera. On the other hand, in the third embodiment, processing corresponding to an icon on a locus of an image or a cursor is performed upon image data in accordance with both of the inclination and angular velocity of a digital camera. Like in the first embodiment, in the third embodiment, a digital camera is used as an image processing apparatus. The same reference numerals are used to identify components already described with reference to the rear view of a digital camera according to the first embodiment illustrated in FIG. 1 and the block diagram of the digital camera illustrated in FIG. 2. If the image switching mark 214 is selected with the thumbnail image 201, switching among images to be processed is performed. A program corresponding to a process illustrated in FIG. 8 is recorded in the memory 321.

Figure 8:
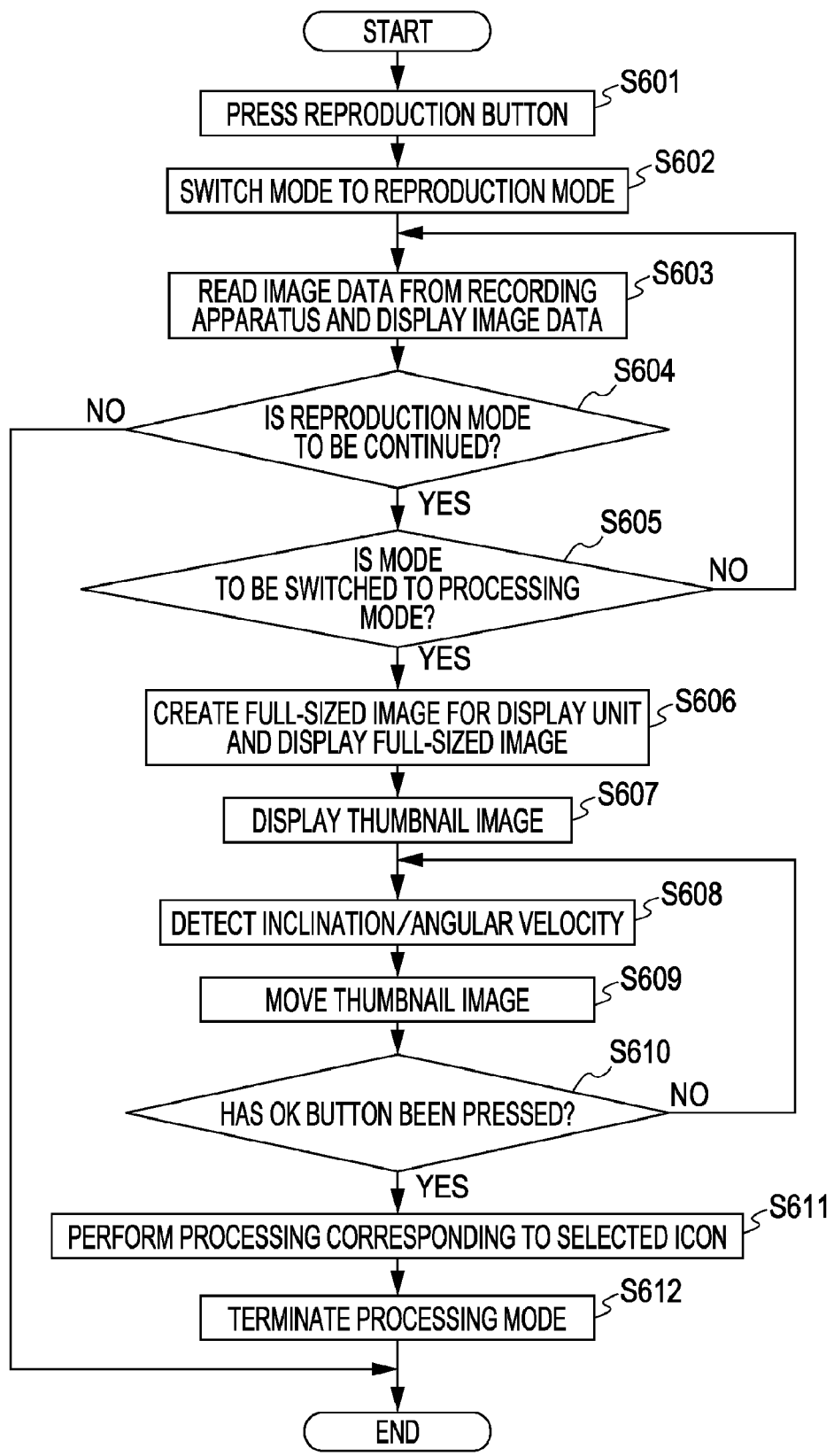
FIG. 8 is a diagram illustrating a process performed by an image processing apparatus according to a third embodiment of the present invention.
Figure 9:
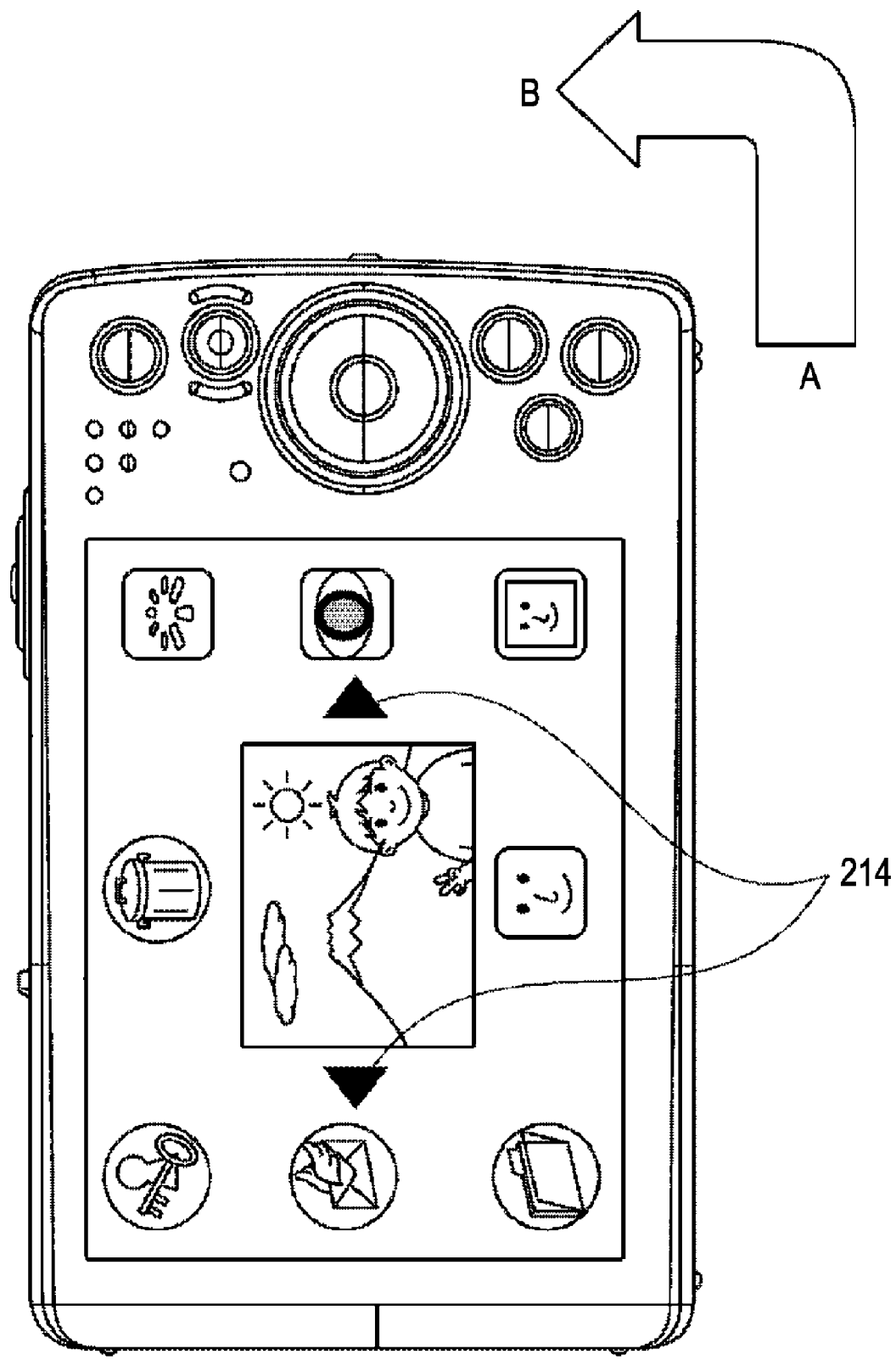
FIG. 9 is a system diagram illustrating a process performed by an image processing apparatus according to the third embodiment of the present invention.

FIG. 8 is a diagram describing a case in which both of the angular velocity detection unit 318 and the inclination detection unit 317 are used in the image processing apparatus (digital camera) 100. FIG. 9 is a system diagram illustrating the process illustrated in FIG. 8 using actual motions of an apparatus.

In this embodiment, the orientation of the image processing apparatus 100 illustrated in FIG. 1 is defined as a normal position, and the orientation of the image processing apparatus 100 illustrated in FIG. 9 is defined as a vertical position. It is assumed that the image processing apparatus 100 is rotated counterclockwise from the normal position to the vertical position (the image processing apparatus 100 is rotated from a normal position A to a vertical position B in FIG. 9). In this case, if the thumbnail image 201 is moved on the basis of the detection result of the inclination detection unit 317, the thumbnail image 201 is moved to the position of the mail icon 203. At that time, the angular velocity detection unit 318 may detect the angular velocity of the image processing apparatus 100, and a speed at which the thumbnail image 201 is moved to the mail icon 203 can be changed on the basis of the detection result of the angular velocity. A process illustrated in FIG. 8 is performed in accordance with a control program read out from the memory 321 under the control of the control unit 319.

A control process performed by the control unit 319 will be described in detail below. If the reproduction button 103 is pressed, the process illustrated in FIG. 8 is started.

In step S601, it is checked that the reproduction button 103 has been pressed.

In step S602, the mode switching unit 315 changes the mode of the image processing apparatus 100 to a reproduction mode.

In step S603, the CPU 311 reads out the image data for storage from the recording apparatus 306. The read image data for storage is displayed on the display unit 101 as an image by the video engine 304.

In step S604, if it is determined that the release button 108 or the power button 102 has been pressed, the reproduction mode ends. If the pressed button is the release button 108, the reproduction mode is changed to an image capturing mode. If the pressed button is the power button 102, the image processing apparatus 100 is powered off. If it is determined that the release button 108 and the power button 102 have not been pressed, the reproduction mode is continued and the process proceeds to step S605.

In step S605, if it is determined that the display button 106 has been pressed, the reproduction mode is changed to the processing mode. If it is not determined that the display button 106 has been pressed, the reproduction mode is continued.

In step S606, the icon display instruction unit 320 displays the icons 202 to 209 representing pieces of processing for the image data for storage on the display unit 101 in accordance with the operation of the display button 106.

In step S607, the thumbnail image 201 is displayed on the display unit 101. Switching among the thumbnail images 201 to be processed can be performed with the four-direction key 104. If the thumbnail image 201 is moved to the position of the image switching mark 214, switching among the thumbnail images 201 to be processed can also be performed.

In step S608, the inclination detection unit 317 and the angular velocity detection unit 318 detect the inclination and angular velocity of the image processing apparatus, respectively, and individually transmit the detection results to the control unit 319.

In step S609, the video engine 304 moves the thumbnail image 201 in a direction toward which the image processing apparatus 100 has been inclined so as to move the thumbnail image 201 to the position of one of the icons 202 to 209. For example, if the lower portion of the image processing apparatus 100 is inclined forward from a horizontal state, the angular velocity detection unit 318 detects the inclination of the image processing apparatus 100 in the X-axis direction. The inclination detection unit 317 provides gravity for the image processing apparatus 100, and the thumbnail image 201 moves downwardly on the display unit 101. If the image processing apparatus 100 is rotated about the Z axis in a state in which the Y axis is perpendicular to the ground, the thumbnail image 201 stays there. Subsequently, the inclination detection unit 317 provides gravity for the image processing apparatus 100, and the thumbnail image 201 moves downwardly on the display unit 101. The thumbnail image 201 is not necessarily moved in the same direction as a direction detected by the angular velocity detection unit 318. The thumbnail image 201 may be moved toward the most appropriate icon in a direction of an angular velocity detected by the angular velocity detection unit 318.

In step S610, the control unit 319 determines whether the OK button 105 has been pressed and is in the OFF state. If the OK button 105 is not in the OFF state, the inclination of the image processing apparatus 100 is continuously detected. That is, until the OK button 105 is pressed, a user can change a moving direction of the thumbnail image 201 on the display unit 101 by inclining the image processing apparatus 100. If it is determined that the OK button 105 has been pressed, the process proceeds to step S611.

In step S611, one of icons which overlaps the thumbnail image 201 is selected when it is determined that the OK button 105 is in the OFF state, and processing corresponding to the selected icon is performed upon the image data for storage. For example, if the thumbnail image 201 overlaps the mail icon 203, the image data for storage corresponding to the thumbnail image 201 set at the position of the mail icon 203 is transmitted to a specified address. If the thumbnail image 201 overlaps a custom color processing icon 209, the color of the image data for storage is corrected in accordance with a correction mode set in advance. For example, examples of the correction mode include a portrait mode in which a red color is emphasized and sharpness is reduced, a landscape mode in which green and blue colors are emphasized and sharpness is increased, and a monochrome mode in which no colors are used. Before processing corresponding to the selected icon is performed upon the image data for storage, a user may determine whether the processing should be actually performed upon the image data for storage.

In step S612, the processing mode ends.

As described previously, the thumbnail image 201 corresponding to the image data for storage to be processed and icons representing pieces of processing for the image data for storage are displayed together, and the thumbnail image 201 is moved in accordance with changes in the inclination and angular velocity of the image processing apparatus 100. Processing corresponding to an icon located at the position of the moved thumbnail image 201 is performed upon the image data for storage. Thus, a user can intuitively perform processing upon an image without performing a complicated operation, for example, operating a button included in a touch panel or an apparatus.

In this embodiment, the thumbnail image 201 is moved. However, like in the case of the second embodiment, a cursor may be used to select an icon representing processing. Even if the thumbnail image 201 overlaps a plurality of icons, such a situation can be similarly addressed as described previously in the first and second embodiments.

Next, a fourth embodiment of the present invention will be described. In the first, second and third embodiments, in order to select an item representing processing, an image to be processed or a cursor is moved in accordance with a change in the orientation of a digital camera. On the other hand, in the fourth embodiment, processing corresponding to an icon on a locus of an image or a cursor is performed upon image data in accordance with a change in the orientation of a digital camera. Like in the first embodiment, in the fourth embodiment, a digital camera is used as an image processing apparatus. The same reference numerals are used to identify components already described with reference to the rear view of a digital camera according to the first embodiment illustrated in FIG. 1 and the block diagram of the digital camera illustrated in FIG. 2. A program corresponding to a process illustrated in FIG. 10 is recorded in the memory 321.

Figure 10:
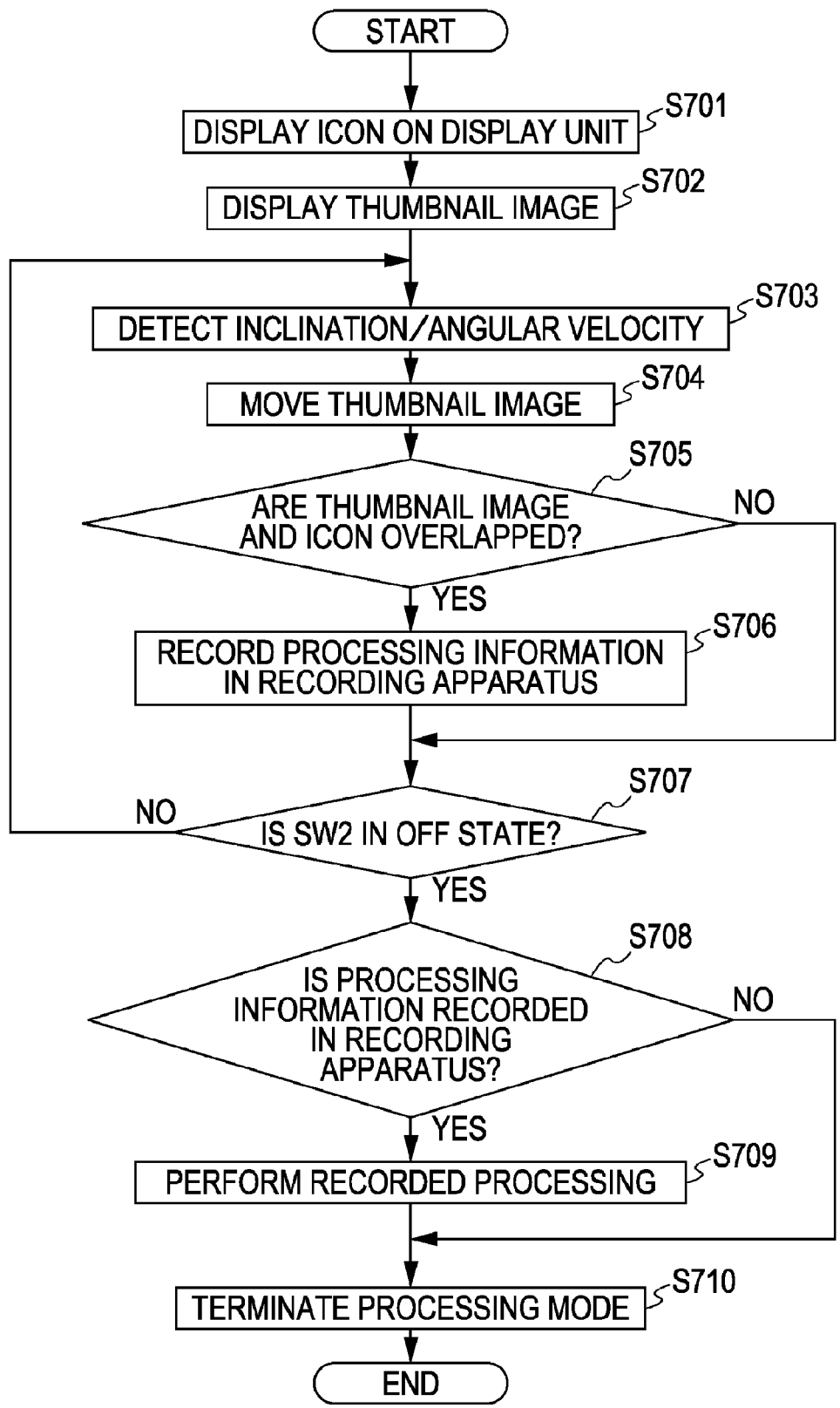
FIG. 10 is a diagram illustrating a process performed by an image processing apparatus according to a fourth embodiment of the present invention.
Figure 11:
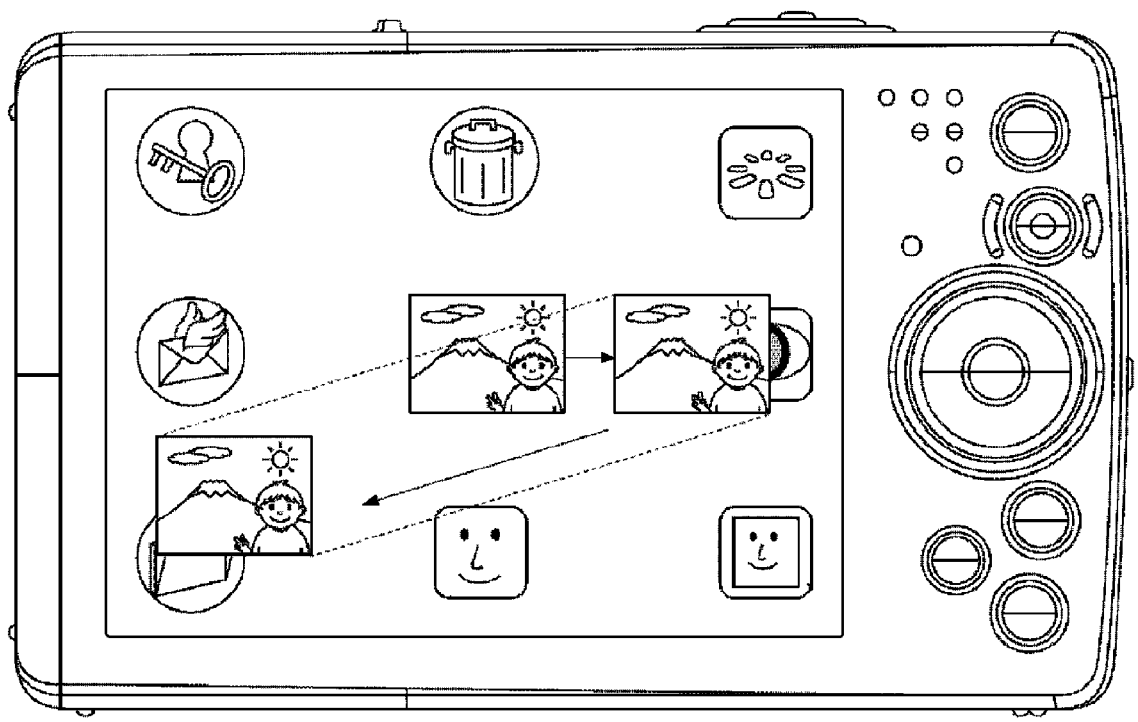
FIG. 11 is a system diagram illustrating a process performed by an image processing apparatus according to the fourth embodiment of the present invention.

FIG. 10 is a diagram describing a case in which processing corresponding to an icon on a locus of an image moved in accordance with a change in the orientation of the image processing apparatus (digital camera) 100 is performed in the image processing apparatus 100. FIG. 11 is a system diagram illustrating a process illustrated in FIG. 10 using actual motions of an apparatus. The process illustrated in FIG. 10 is performed in accordance with a control program read out from the memory 321 under the control of the control unit 319.

A control process performed by the control unit 319 will be described in detail below. In this embodiment, the process from step S408 in which a mode of an image processing apparatus is changed to the processing mode in the first embodiment will be described.

In step S701, the icon display instruction unit 320 displays the icons 202 to 209 on the display unit 101 in accordance with the operation of the display button 106.

In step S702, the video engine 304 displays the thumbnail image 201 on the display unit 101.

In step S703, the angular velocity detection unit 318 detects a change in the orientation of the image processing apparatus, and transmits the detection result to the control unit 319.

In step S704, the video engine 304 moves the thumbnail image 201 in a direction toward which the image processing apparatus 100 has been inclined so as to move the thumbnail image 201 to the position of one of the icons 202 to 209. For example, if the upper portion of the image processing apparatus 100 is inclined forward, the angular velocity detection unit 318 detects the inclination of the image processing apparatus 100 in the X-axis direction and the thumbnail image 201 is moved upwardly on the display unit 101. If the right portion of the image processing apparatus 100 is inclined forward, the inclination of the image processing apparatus 100 in the Y-axis direction is detected and the thumbnail image 201 is moved right. If the image processing apparatus 100 is inclined obliquely, the thumbnail image 201 is moved in a direction obtained by adding detected angular velocities of axes. The thumbnail image 201 is not necessarily moved in the same direction as a direction detected by the angular velocity detection unit 318. The thumbnail image 201 may be moved toward the most appropriate icon in a direction of an angular velocity detected by the angular velocity detection unit 318.

In step S705, the control unit 319 determines whether the thumbnail image 201 has overlapped an icon while moving. If it is determined that the thumbnail image 201 has overlapped an icon, the process proceeds to step S706. If it is not determined that the thumbnail image 201 has overlapped an icon, the process proceeds to step S707.

In step S706, information about processing corresponding to an icon determined in step S705 to have overlapped the thumbnail image 201 is recorded in the recording apparatus 306.

In step S707, the control unit 319 determines whether the second switch of the release button 108 is in the OFF state. If the second switch of the release button 108 is not in the OFF state, the process proceeds to step S704 and the orientation of the image processing apparatus 100 is continuously detected. That is, while the second switch of the release button 108 is in the ON state, a user can move the thumbnail image 201 on the display unit 101 by inclining the image processing apparatus 100. If it is determined that the second switch is in the OFF state, the process proceeds to step S708.

In step S708, it is determined whether information about processing is recorded in the recording apparatus 306. If information about processing is not recorded, the process proceeds to step S710. If information about processing is recorded, the process proceeds to step S709.

In step S709, the image data for storage corresponding to the thumbnail image 201 is processed on the basis of the information about processing recorded in the recording apparatus 306. For example, if the thumbnail image 201 is moved as illustrated in FIG. 11 and pieces of information about the red-eye correction icon 208 and the storage icon 202 are recorded in the recording apparatus 306, a red-eye effect detected from the image data for storage is corrected and the corrected image data is stored in a folder. Before processing is performed, a user may determine whether processing corresponding to an icon should be actually performed upon the image data for storage. In this embodiment, two pieces of processing information corresponding to two icons on the locus of a moving thumbnail image are recorded. However, the number of pieces of processing information is not limited thereto, and may be one or more.

In step S710, the processing mode ends.

Consequently, processing corresponding to an icon on the locus of the thumbnail image 201 moved in accordance with a change in the orientation of the image processing apparatus 100 is performed upon the image data for storage corresponding to the thumbnail image 201 displayed with the icon on the same screen.

As described previously, the thumbnail image 201 corresponding to the image data for storage to be processed and icons representing pieces of processing for the image data for storage are displayed together. The thumbnail image 201 is moved in accordance with a change in the orientation of the image processing apparatus 100. Pieces of processing corresponding to icons on the locus of the moving thumbnail image 201 are performed upon the image data for storage. As a result, a user can intuitively perform a plurality of pieces of processing upon an image in the image processing apparatus 100 without performing a complicated operation, for example, operating a button included in a touch panel or an apparatus.

In this embodiment, the thumbnail image 201 is moved. However, like in the case of the second embodiment, a cursor may be used to select processing. Even if the thumbnail image 201 overlaps a plurality of icons, such a situation can be similarly addressed as described previously in the first and second embodiments.

In the first to fourth embodiments, a digital camera is used as an image processing apparatus. However, for example, an apparatus having an image reproduction function such as a DVD reproduction apparatus (a DVD deck or a portable TV), a personal digital assistant (PDA), or a mobile telephone may be used. The thumbnail image 201 or the arrow 210 is moved in accordance with a change in the orientation of the image processing apparatus 100. However, by operating the four-direction key 104, a user can move the thumbnail image 201 or the arrow 210. Processing may be performed upon the image data for storage on the basis of the result of movement of the thumbnail image 201 or the arrow 210.

In another embodiment of the present invention, a portion on which items representing pieces of processing are displayed and one of these items is selected and a portion in which processing corresponding to the selected item is performed may be disposed apart from each other. For example, a display unit on which icons are displayed and units for detecting a change in the orientation of an apparatus such as an inclination detection unit and an angular velocity detection unit may be disposed in a portable apparatus provided separately from an image processing apparatus, and processing selected in the portable apparatus may be performed in the image processing apparatus. In this case, one of items representing pieces of processing for the image data for storage is selected in the portable apparatus in accordance with a result of detection of a change in the orientation of the portable apparatus or an operation result of an operation unit included in the portable apparatus. Information about processing corresponding to the selected item is transmitted to the image processing apparatus, and the processing selected in the portable apparatus is performed upon the image data for storage under the control of a control unit included in the image processing apparatus.

In the above-described embodiments, the present invention is implemented by a program. However, all or some of functions implemented by a program may be replaced by a piece of hardware.

Thus, according to the above-described embodiments of the present invention, there can be provided an image processing apparatus and an image processing method allowing a user to intuitively and easily perform various pieces of processing upon an image.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-146996 filed Jun. 4, 2008, which is hereby incorporated by reference herein in its entirety.

What is claimed is:

1. An image processing apparatus for displaying an image comprising:
    a display unit configured to display the image based on image data generated by an image pickup element and a plurality of item representing processing for the image data on the same screen;
    a detection unit configured to detect a change in an orientation of the image processing apparatus;
    a processing unit configured to perform the processing represented by one of the items upon the image data;
    a control unit configured to control the processing unit so as to cause the processing unit to perform the processing represented by one of the items upon the image data corresponding to the image based on a detection result of the detection unit; and
    a moving unit configured to move the image displayed on the display unit,
    wherein the moving unit moves the image displayed on the display unit based on a detection result of the detection unit,
    wherein the control unit controls the processing unit so as to cause the processing unit to perform upon the image data the processing represented by one of the items located at a position of the image moved by the moving unit.

2. The image processing apparatus according to claim 1, wherein the display unit and the detection unit are disposed in a portable apparatus provided separately from the image processing apparatus.

3. The image processing apparatus according to claim 1, wherein the control unit controls the processing unit so as to cause the processing unit to perform upon the image data the processing represented by one of the items that first overlaps the image moved by the moving unit.

4. The image processing apparatus according to claim 1, wherein, in a case that there are a plurality of items on a locus of the image moved by the moving unit, the control unit controls the processing unit so as to cause the processing unit to perform pieces of processing represented by the plurality of items upon the image data.

5. The image processing apparatus according to claim 1, further comprising a determination unit configured to, in a case that the image moved by the moving unit overlaps at least two or more items, determine which of pieces of processing represented by the items should be performed upon the image data.

6. The image processing apparatus according to claim 1, further comprising an image switching unit configured to change the image to be processed displayed on the display unit.

7. The image processing apparatus according to claim 1, further comprising: an image capturing unit configured to capture an image of a subject; and a recording unit configured to record the image data of the image captured by the image capturing unit, and
    wherein, after the image capturing unit has captured the image of the subject, the processing unit performs the processing represented by the item upon the image data.

8. The image processing apparatus according to claim 7, further comprising a release button configured to instruct the image capturing unit to perform image capturing, and
    wherein the processing unit starts to perform the processing represented by the item upon the image data in accordance with an operation status of the release button.

9. The image processing apparatus according to claim 8, wherein, in a case that the release button has been kept pressed for a predetermined period or longer, the processing unit starts to perform the processing represented by the item upon the image data.

10. The image processing apparatus according to claim 1, wherein the item is an icon.

11. The image processing apparatus according to claim 1, wherein the change in the orientation of the image processing apparatus detected by the detection unit includes at least one of an inclination of the image processing apparatus and an angular velocity of the image processing apparatus.

12. An image processing method for an image processing apparatus for displaying an image comprising:
    displaying the image based on image data generated by an image pickup element and a plurality of items representing processing for the image data on the same screen of a display unit;
    detecting a change in an orientation of the image processing apparatus;

performing processing represented by one of the items upon the image data corresponding to the image based on a detection result; and
moving the image displayed on the display unit,
wherein the image displayed on the display unit is moved based on a detection result, wherein processing represented by one of the items located at a position of the moved image is performed upon the image data.

* * * * *